(12) United States Patent
Cheng (10) Patent No.: US 8,397,993 B2
(45) Date of Patent: Mar. 19, 2013

(54) PRINTING CONTROL METHOD AND PRINTING CONTROL APPARATUS FOR LINE LIGHT SOURCE DETECTION

(75) Inventor: Ting-Yuan Cheng, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 0 days.

(21) Appl. No.: 13/083,609

(22) Filed: Apr. 11, 2011

(65) Prior Publication Data

US 2012/0118948 A1 May 17, 2012

(30) Foreign Application Priority Data

Nov. 12, 2010 (TW) .............................. 99138923 A (51) Int. Cl.
*G06K 7/10* (2006.01)

(52) U.S. Cl. .............................. 235/462.26; 235/462.01

(58) Field of Classification Search ............. 235/462.26, 235/462.01
See application file for complete search history.

(56) References Cited

U.S. PATENT DOCUMENTS

| 2004/0004127 | A1* | 1/2004 | Nakamura et al. | 235/462.26 |
| 2004/0169083 | A1* | 9/2004 | Kolstad | 235/462.26 |

* cited by examiner

*Primary Examiner* — Daniel Hess
(74) *Attorney, Agent, or Firm* — Winston Hsu; Scott Margo (57) ABSTRACT

A printing control method for line light source detection, for controlling at least one printing parameter of a printing apparatus. The printing control method includes: utilizing a line light source to scan a barcode to derive a barcode profile corresponding to the barcode; deriving a grading information corresponding to the barcode according to the barcode profile and a threshold, and deriving a modified barcode profile according to the grading information and the barcode profile; and adjusting the at least one printing parameter of the printing apparatus according to the modified barcode profile.

14 Claims, 6 Drawing Sheets

PRINTING CONTROL METHOD AND PRINTING CONTROL APPARATUS FOR LINE LIGHT SOURCE DETECTION

BACKGROUND OF THE INVENTION

1. Field of the Invention

The present invention relates to controlling printing of a barcode, and more particularly, to a printing control method and a printing control apparatus utilizing a line light source detection result of a barcode.

2. Description of the Prior Art

A general barcode detection method applies a point light source as a detection apparatus which emits light and so that a light signal reflected from a barcode can be received for the subsequent detection process. However, a point light source (e.g., a laser beam source) is not a common product, and usually is expensive. If a more common and cheaper line light source (e.g., general fluorescent light) is utilized to perform detection, diffraction interference occurs and the correct detection result cannot be derived.

Generally, grading parameters of a barcode printed from a printing apparatus, for example, symbol contrast, decodability and barcode width growth can be examined by a verifier, and those derived grading parameters are fed back to the printing apparatus to further adjust printing parameters of the printing apparatus in order to obtain better printing quality. For example, please refer to FIG. 1, which is a diagram of applying a point light source to adjust a printing apparatus 110 with conventional technology. After the printing apparatus 110 prints out a barcode BC, a point light source detection element 120 will process the barcode BC to obtain a point light source detection result D_P, i.e., a reflectance of the barcode BC under the point light source. Next, a verifier 130 within the printing control apparatus 100 will receive the point light source detection result D_P, and generate a verification result R_P transmitted to a control element 140, and the control element 140 will adjust printing parameters of the printing apparatus 110 according to the verification result R_P in order to derive better barcode printing results.

Figure 1:
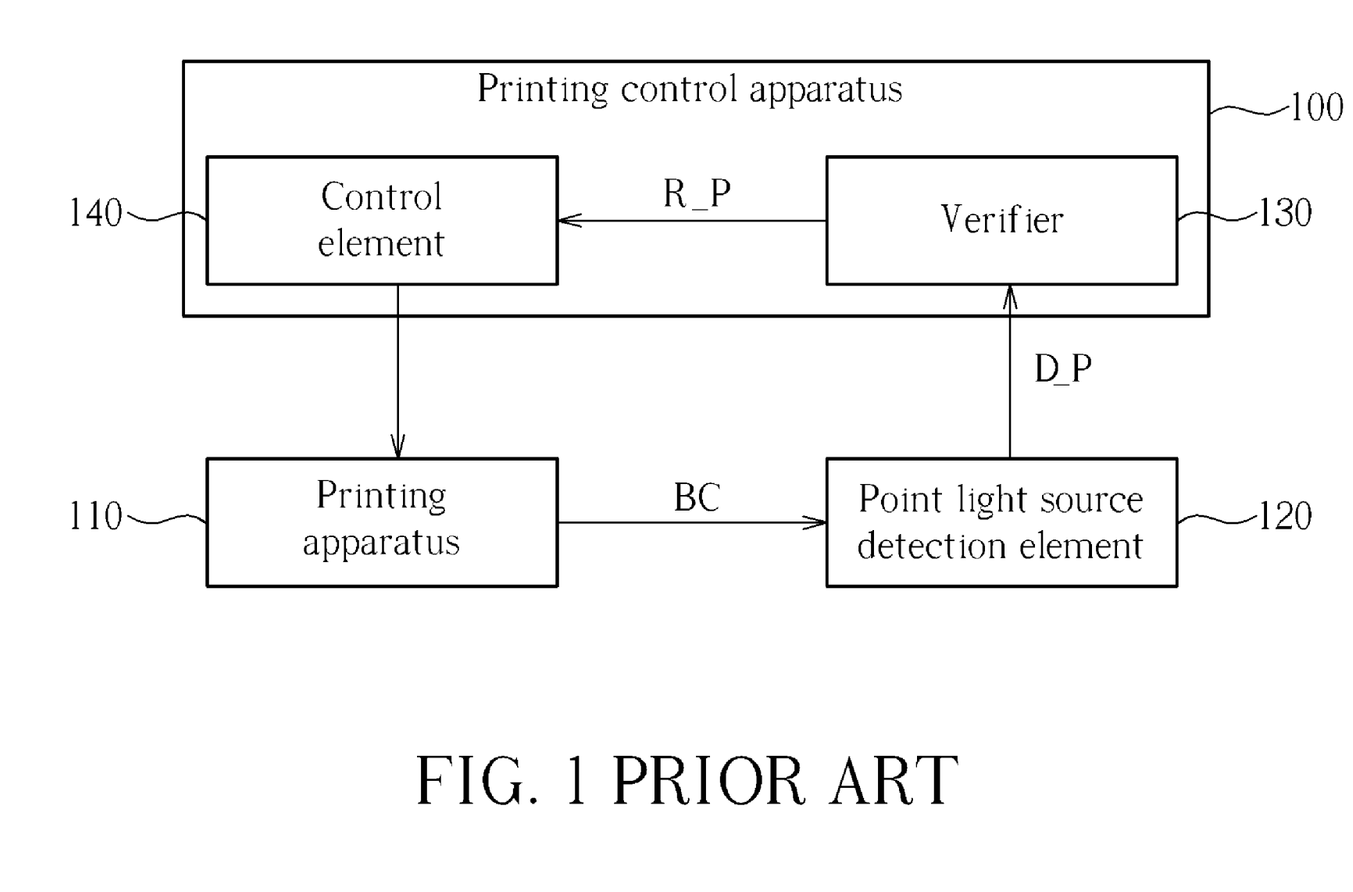
FIG. 1 is a diagram of applying a point light source to adjust a printing apparatus with conventional technology.
Figure 2:
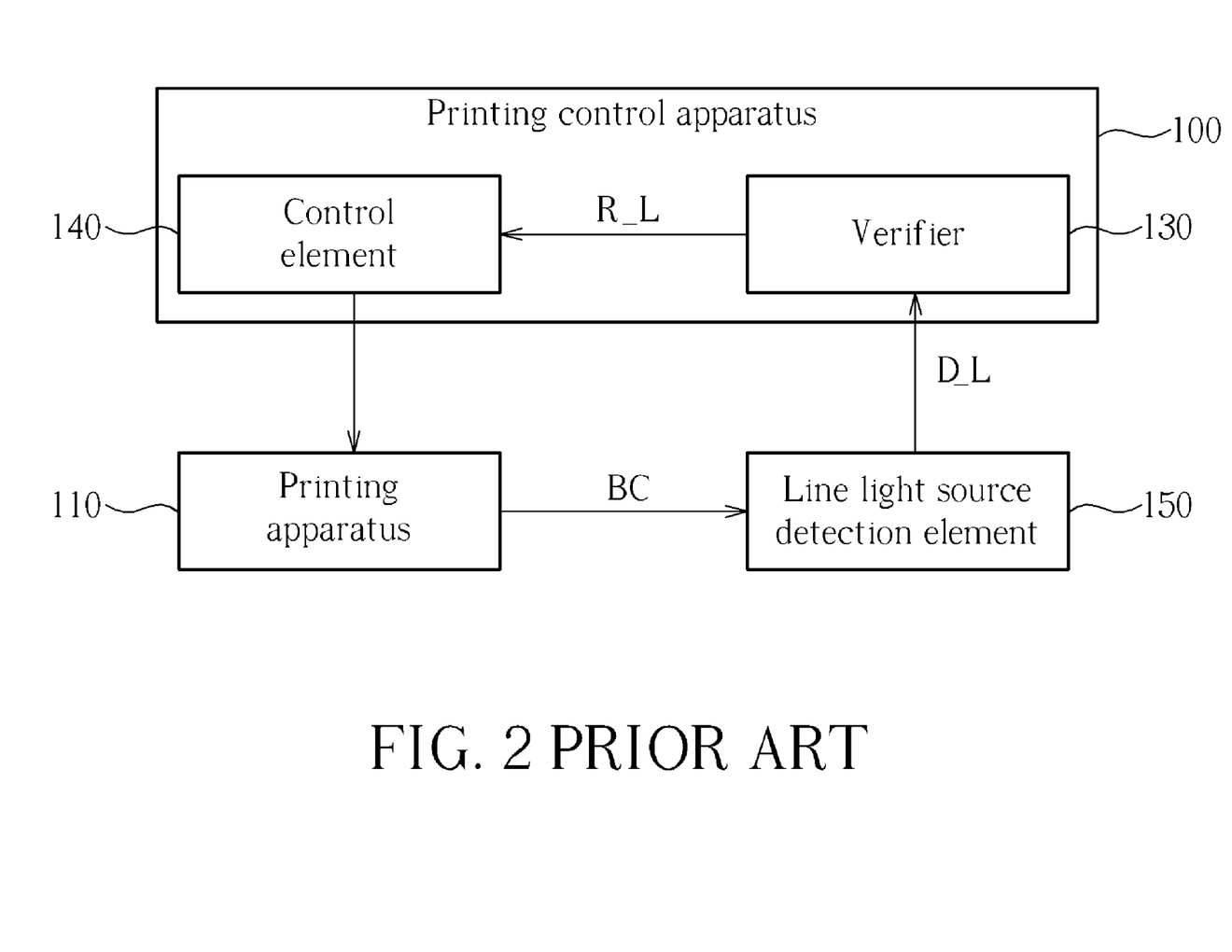
FIG. 2 is a diagram of applying a line light source to adjust a printing apparatus with conventional technology.

Please refer to FIG. 2, which is a diagram of applying a line light source to adjust the printing apparatus 110 with conventional technology. The difference between FIG. 1 and FIG. 2 is that a line light source detection element 150 is utilized in FIG. 2 to process the barcode BC to derive a line light source detection result D_L, the verifier 130 will receive the line light source detection result D_L and derive grading parameters about the barcode BC according to all the reflectance within the line light source detection result D_L, so as to generate a verification result R_L to the control element 140. The control element 140 will then adjust printing parameters of the printing apparatus 110 according to the verification result R_L.

Figure 3:
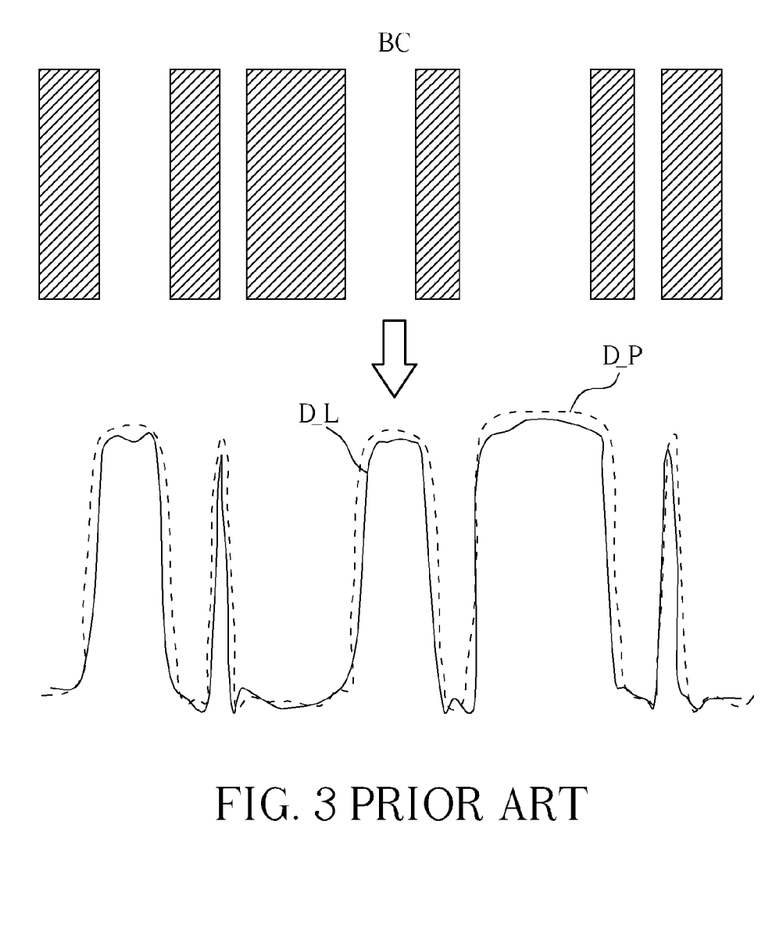
FIG. 3 is a diagram of a barcode, a point light source detection result and a line light source detection result both corresponding to the barcode.

Please refer to FIG. 3 in conjunction with FIG. 1 and FIG. 2. FIG. 3 is a diagram of the barcode BC, the point light source detection result D_P and line light source detection result D_L both corresponding to the barcode BC. From FIG. 3, the inherent figure characteristics (i.e., those white identification bars and black identification bars arranged alternately with different widths) will be converted into different data according to a different luminance value of each identification bar, i.e., the point light source detection result D_P and line light source detection result D_L shown in FIG. 3. Although the point light source detection result D_P and line light source detection result D_L have similar data, the point light source detection result D_P is slightly higher than the line light source detection result D_L at high reflectance (for example, a white identification with high luminance). This is because diffractions from other places (for example, the black identification bars around the white identification bars) interfere with the detection result, and at low reflectance, those two detection results have no obvious difference. Furthermore, the width of each identification bar derived according to the line light source detection result D_L is also different from the one derived according to the point light source detection result D_P due to diffraction. In addition, since a typical line light source has less light intensity than does a point light source, the verifier 130 will occur more errors when processing the line light source detection result D_L than when processing the point light source detection result D_P. Therefore, a typical verifier usually does not tend to utilize a line light source for detection and adjusting printing parameters of a printing apparatus.

SUMMARY OF THE INVENTION

In light of the aforementioned issues, the present invention provides a printing control method and a printing control apparatus for line light source detection to overcome the diffraction errors resulting from using a line light source. The present invention utilizes a more economic line light source to derive a detection result of a barcode, and applies the line light source detection result to correctly adjust the printing apparatus which printed the barcode according to the line light source detection result.

According to a first embodiment of the present invention, a printing control method for line light source detection for controlling at least one printing parameter of a printing apparatus, the printing control method includes: utilizing a line light source to scan a barcode to derive a barcode profile corresponding to the barcode; deriving a grading information corresponding to the barcode according to the barcode profile and a threshold, and deriving a modified barcode profile according to the grading information and the barcode profile; and adjusting the at least one printing parameter of the printing apparatus according to the modified barcode profile.

According to a second embodiment of the present invention, a printing control apparatus for line light source detection for controlling at least one printing parameter of a printing apparatus, the printing control apparatus includes a processing element and an adjusting element. The processing element is for receiving a barcode profile, deriving a grading information corresponding to the barcode according to the barcode profile and a threshold, and deriving a modified barcode profile according to the grading information and the barcode profile. The adjusting element is for adjusting the at least one printing parameter of the printing apparatus according to the modified barcode profile.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
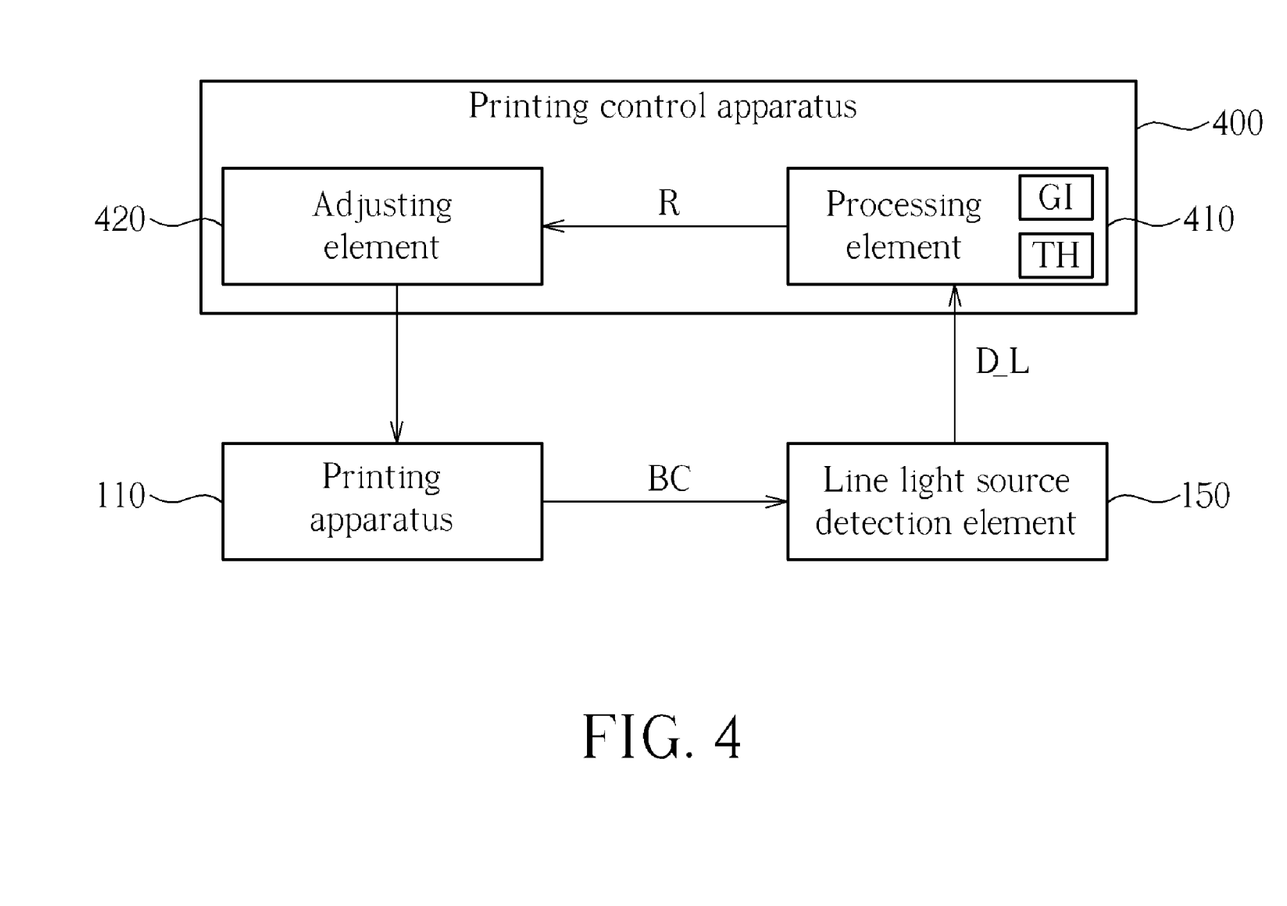
FIG. 4 is a diagram of a printing control apparatus according to an embodiment of the present invention.

Please refer to FIG. 4, which is a diagram of a printing control apparatus 400 according to an embodiment of the present invention. In the present invention, the line light source detection element 150 processes the barcode BC produced by the barcode printing apparatus 110, the printing control apparatus 400 includes (but is not limited to) a processing element 410 and an adjusting element 420. The processing element 410 receives a barcode profile generated from the line light source detection element 150 by applying a line light source to scan the barcode BC, i.e., the line light source detection result D_L of the barcode BC, derives a grading information GI (including one or more grading parameters, e.g., the grading information includes at least one of the symbol contrast, the decodability and the identification bar width growth), and refers to the grading information GI and line light source detection result D_L to derive a modified barcode profile R, wherein a threshold TH is for a reference to determine a black identification bar or a white identification bar, for example, when a luminance exceeds the threshold TH, the processing element 410 will determine the identification bar as a white identification bar, otherwise, the processing element 410 will determine the identification bar as a black identification bar. Finally, the adjusting element 420 will adjust at least one printing parameter of the printing apparatus 110 according to the modified barcode profile R.

Figure 5:
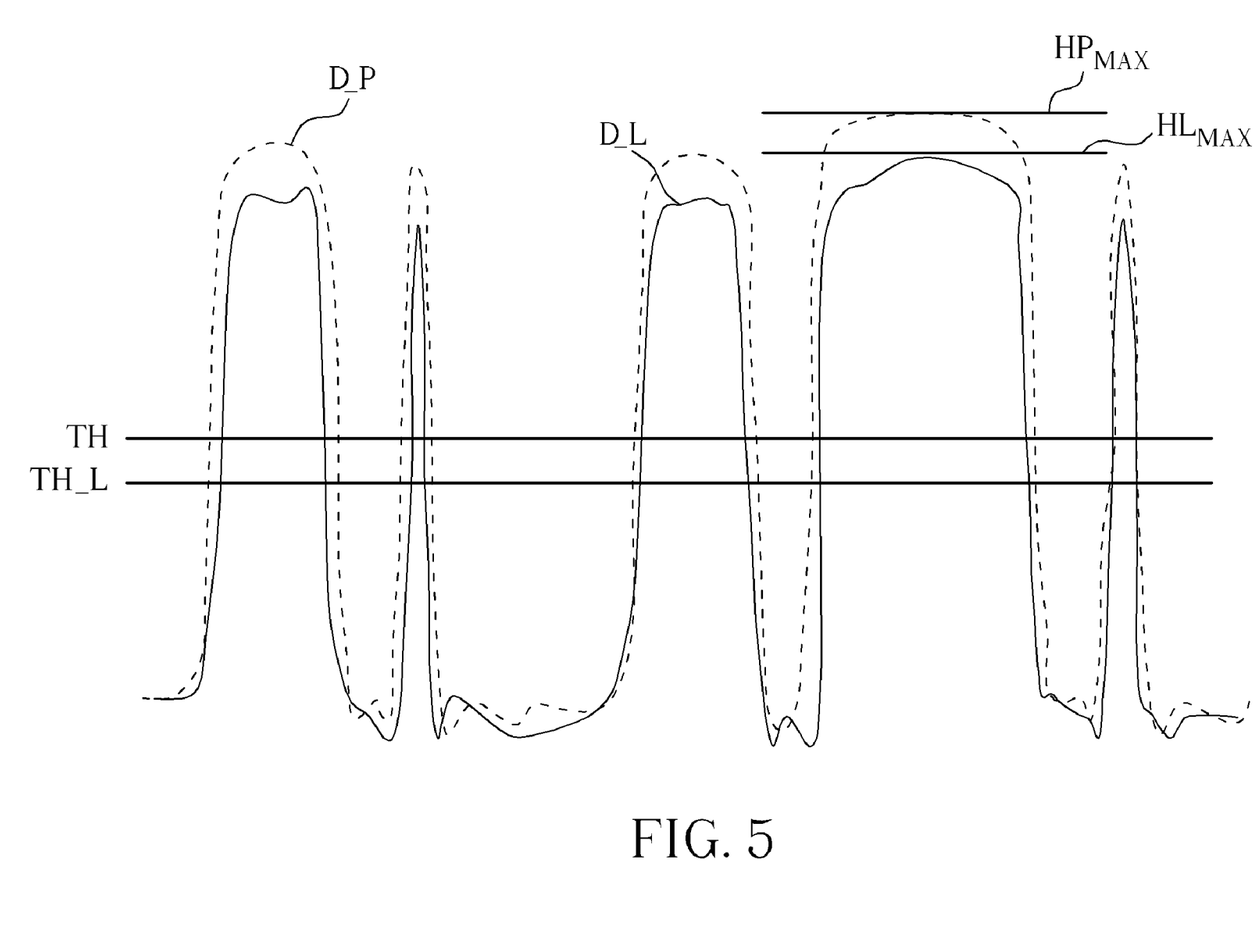
FIG. 5 is an operation diagram of calculating a threshold according to an embodiment of the present invention.

In one embodiment of the present invention, the processing element 410 will read a point light source detection result as a reference barcode profile, and utilize the reference barcode profile (i.e., the point light source detection result D_P), the barcode profile (i.e., the line light source detection result D_L) to calculate the threshold TH. Please refer to FIG. 5, which is an operation diagram of calculating the threshold TH according to an embodiment of the present invention. First of all, the processing element 410 refers to the line light source detection result D_L to derive an initial threshold TH_L. However, from FIG. 5, the line light source detection result D_L has luminance values (i.e., reflectance) lower than that of the point light source detection result D_P due to diffraction, the difference is particularly obvious at high luminance. Therefore, the processing element 410 will calculate a maximum reference luminance $HP_{MAX}$ of the point light source detection result D_P and a maximum luminance $HL_{MAX}$ of the line light source detection result D_L, and refer to the initial threshold TH_L and a ratio $HP_{MAX}/HL_{MAX}$, the maximum reference luminance $HP_{MAX}$ to the maximum luminance $HL_{MAX}$, to derive the threshold $TH=(HP_{MAX}/HL_{MAX})*TH\_L$, as shown in FIG. 5. However, in other embodiments of the present invention, the processing element 410 can directly utilize a default maximum luminance value to determine the threshold TH without reading the other reference barcode profiles, in addition, the processing element 410 can also utilize maximum luminance values corresponding to characteristics of different printed papers as references to determine a most suitable threshold TH, those variations in design all comply with the spirit of the present invention.

After determining the threshold TH, the processing element 410 starts to process the barcode profile (i.e., the line light source detection result D_L) to derive the modified barcode profile R. For example, in one embodiment of the present invention, the processing element 410 firstly calculates the maximum reference luminance $HP_{MAX}$ of the point light source detection result D_P and the maximum luminance $HL_{MAX}$ of the line light source detection result D_L, and refer to a ratio $g1=HP_{MAX}/HL_{MAX}$ to modify the line light source detection result D_L to derive a first modified result D_L1, wherein the first modified result D_L1 is a product of the line light source detection result D_L and the ratio $g1=HP_{MAX}/HL_{MAX}$ ($D\_L1=D\_L*g1=D\_L*(HP_{MAX}/HL_{MAX})$). Generally speaking, the first modified result D_L1, after correction, has a symbol contrast parameter very close to a symbol contrast parameter (i.e., a difference between a maximum detected luminance and a minimum detected luminance) of the point light source detection result D_P. However, in the other embodiments, the processing element 410 can also utilize a maximum luminance value H of a paper of usage to modify the line light source detection result D_L, for example, the ratio $g1=H/HL_{MAX}$, the first modified result $D\_L1=D\_L*(H/HL_{MAX})$.

Since each grading parameter of a same barcode is highly related to each other, if only the symbol contrast is modified, the other grading parameters, e.g., decodability (an identification extent of a width of each identification bar within a barcode) or bar width growth (an accumulated difference between a width of a detected black identification bar with its own theoretical value), etc., will be distorted such that the printing apparatus 110 cannot be adjusted correctly. Therefore, the printing control apparatus 400 will further perform modification for the decodability parameter and the bar width growth parameter in the grading information GI to derive a better adjusting result, however, the aforementioned examples are only a preferred embodiment of the present invention and in other embodiments, the printing control apparatus 400 can also utilize a combination of the other grading parameters to adjust the printing parameters of the printing apparatus 110, as long as a technology utilizes a line light source detection result of a barcode to perform modification, and applies the modified barcode profile to adjust a printing parameter of a printing apparatus, it falls within the scope of the present invention.

Figure 6:
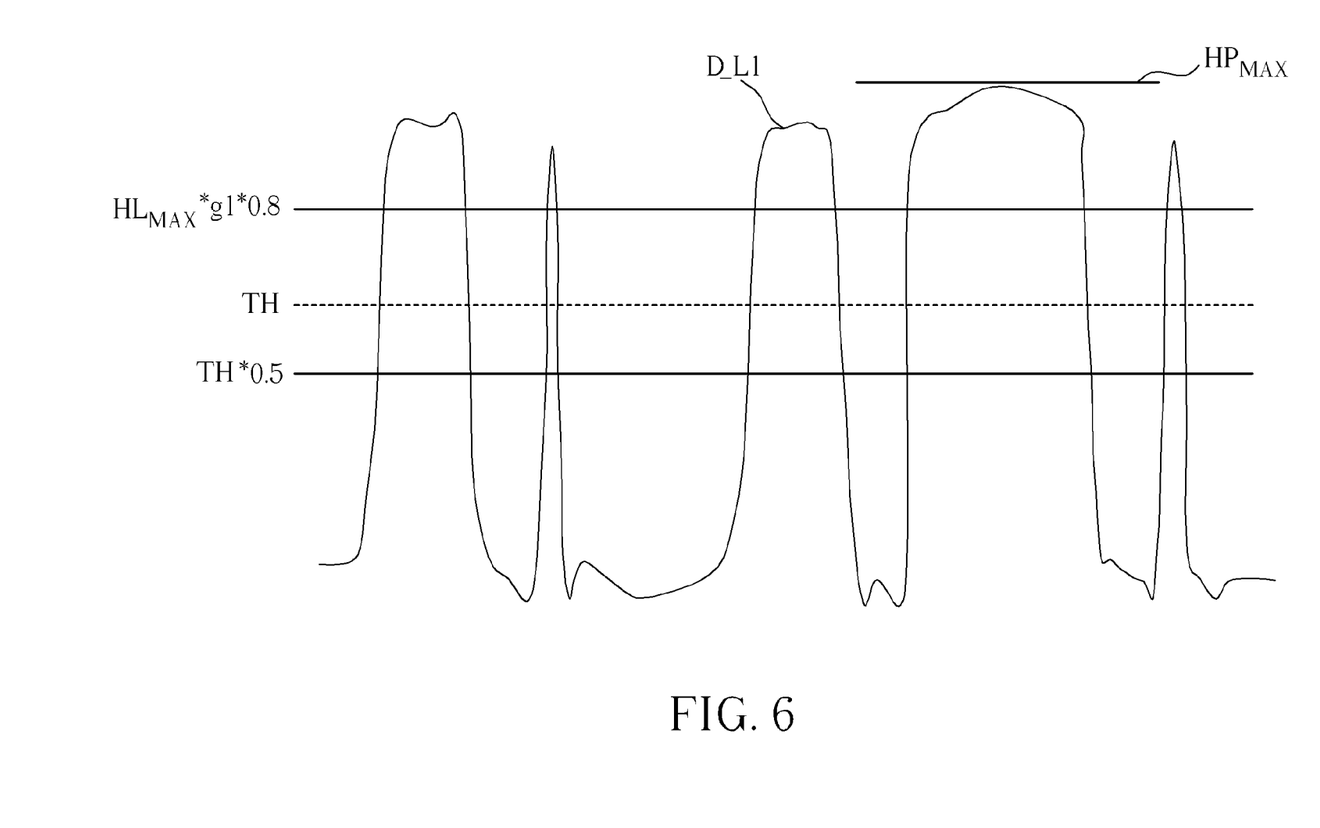
FIG. 6 is an operation diagram of modifying a first modification result according to an embodiment of the present invention.

Since the first modification result D_L1 is adjusted for symbol contrast, the widths of identification bars are distorted due to over-modification, therefore, after deriving the first modification result D_L1, the processing element 410 will continue to modify the decodability of the first modification result DL1. First of all, the processing element 410 refers to the first modification result D_L1 and the threshold TH to determine an adjusting range, for example, within the first modification result D_L1, the processing element 410 will utilize the threshold TH*0.5 and $HL_{MAX}*g1*0.8$ as an upper bound and a lower bound, respectively, to determine the adjusting range, and perform modification for luminance values between the threshold TH*0.5 and $HL_{MAX}*g1*0.8$ (i.e., the adjusting range). Please refer to FIG. 6, which is an operation diagram of modifying the first modification result D_L1 according to an embodiment of the present invention. In FIG. 6, the adjusting range includes the luminance values around the threshold TH in the first modification result D_L1, and the luminance values outside the adjusting range does not influence the value of the decodability parameter. After adjusting values within the adjusting range, a second modification result D_L2 can be derived to adjust a width of each identification bar to a more proper value; the way of adjustment is listed as follows:

$$D\_L2 = \begin{cases} D\_L1 + \left(D\_L1 - \dfrac{D\_L1 \times D\_L1}{255}\right) \times g2 & TH \times 0.5 < D\_L1 < HL_{MAX} \times g1 \times 0.8 \\ D\_L1 & D\_L1 \geq TH \times 0.5, D\_L1 \leq HL_{MAX} \times g1 \times 0.8 \end{cases}$$

wherein g2 is a constant calculated according to a minimum bar width $X_{dim}$ in the first modification result D_L1: $g2=f_{Xdim}(X_{dim})$, when $X_{dim}$ increases, g2 will decrease. After the modification for the minimum bar width $X_{dim}$ mentioned above, there are still over-modifications around the threshold TH in the second modification result D_L2, therefore, the processing element 410 will continue to calculate a bar width growth parameter BWG1 of the second modification result D_L2, and perform a further adjustment within the adjusting range according to the bar width growth parameter BWG1 and the second modification result D_L2 to obtain a third modification result D_L3, the way of adjustment is listed as follows:

$$D\_L3 = \begin{cases} D\_L2 + \left(D\_L2 - \dfrac{D\_L2 \times D\_L2}{255}\right) \times g3 & TH \times 0.5 < D\_L2 < HL_{MAX} \times g1 \times 0.8 \\ D\_L2 & D\_L2 \geq TH \times 0.5, D\_L2 \leq HL_{MAX} \times g1 \times 0.8 \end{cases}$$

wherein g3 is a constant calculated according to the bar width growth parameter BWG1 in the second modification result D_L2: $g3=f_{BWG1}(BWG1)$ when BWG1 increases, g3 also increases. After the calculation above, a better decodability parameter can be derived from the third modification result D_L3.

After modification for decodability, the processing element 410 will further modify for bar width growth. The processing element 410 proceeds to calculate a bar width growth BWG2 in the third modification result D_L3, and refers to the bar width growth BWG2 to adjust luminance values slightly larger than the threshold TH in the third modification result D_L3, and a modified detection result R can be derived, the way of adjustment is listed as follows:

$$R = \begin{cases} D\_L3 - D\_L3 \times g4 & TH < D\_L3 < TH \times 1.1 \\ D\_L3 & D\_L3 \geq TH \times 1.1, D\_L3 \leq TH \end{cases}$$

wherein g4 is a constant calculated according to the bar width growth parameter BWG2 in the third modification result D_L3: $g4=f_{BWG2}(BWG2)$, when BWG2 declines, g4 increases accordingly. After finishing the aforementioned processes, a bar width growth parameter of the modified detection result R will be very close to the bar width growth parameter of the point light source detection result D_P.

The aforementioned processes are only preferred embodiments of the present invention, they are not limitations of the present invention, for example, the grading parameters chosen by the printing control apparatus 400 are not limited to symbol contrast, decodability and bar width growth, etc., in addition, the modification for one single grading parameter is not limited to occurring only once, users can choose to perform modifications for a same grading parameter according to different requirements many times to achieve expectations, and as long as utilizing a line light source detection result of a barcode to perform modification, and applying the modified barcode profile to adjust a printing parameter of a printing apparatus, it falls within the scope of the present invention.

To summarize, the present invention provides a printing control method and apparatus for line light source detection to overcome the diffraction errors resulting from a line light source. To be more specific, the present invention utilizes a more economic line light source to derive a detection result of a barcode, and applies a grading information (including one or more grading parameters) corresponding to the detection result to obtain a modified barcode profile, and uses the modified barcode profile to correctly adjust the printing apparatus which printed the barcode according to the modified barcode profile.

Those skilled in the art will readily observe that numerous modifications and alterations of the device and method may be made while retaining the teachings of the invention.

What is claimed is:

1. A printing control method for line light source detection, for controlling at least one printing parameter of a printing apparatus, comprising:
    utilizing a line light source to scan a barcode to derive a barcode profile corresponding to the barcode;
    deriving a difference between the barcode profile and a reference barcode profile;
    utilizing the difference to determine a threshold;
    deriving a grading information corresponding to the barcode according to the barcode profile and the threshold, and deriving a modified barcode profile according to the grading information, the difference, and the barcode profile; and
    adjusting the at least one printing parameter of the printing apparatus according to the modified barcode profile;
    wherein the reference barcode profile is derived from scanning the barcode with a point light source.

2. The printing control method of claim 1, wherein the barcode is generated by the printing apparatus.

3. The printing control method of claim 1, wherein the reference barcode profile is a default luminance maximum value.

4. The printing control method of claim 1, further comprising:
    calculating an initial threshold according to the barcode profile; and
    calculating a maximum reference luminance value of the reference barcode profile and a maximum luminance value of the barcode profile, and deriving the threshold according to the initial threshold and a ratio of the maximum reference luminance value to the maximum luminance value.

5. The printing control method of claim 1, wherein the step of deriving the grading information corresponding to the barcode according to the barcode profile and the threshold, and deriving the modified barcode profile according to the grading information and the barcode profile comprises:

calculating a maximum reference luminance value of the reference barcode profile and a maximum luminance value of the barcode profile, and deriving a first modified barcode profile according to the barcode profile and a ratio of the maximum reference luminance value to the maximum luminance value; and deriving the modified barcode profile according to the first modified barcode profile.

6. The printing control method of claim 5, wherein the step of deriving the modified barcode profile according to the first modified barcode profile comprises:

determining an adjustment range according to the first modified barcode profile, the grading information and the threshold; and deriving the modified barcode profile according to the first modified barcode profile, the grading information and the adjustment range.

7. The printing control method of claim 1, wherein the grading information comprises at least one of the symbol contrast, the decodability and the bar width growth.

8. A printing control apparatus for line light source detection, for controlling at least one printing parameter of a printing apparatus, the printing control apparatus comprising:

a processing element, for receiving a barcode profile, deriving a difference between the barcode profile and a reference barcode profile to determine a threshold, deriving a grading information corresponding to the barcode according to the barcode profile and the threshold, and deriving a modified barcode profile according to the grading information, the difference, and the barcode profile; and an adjusting element, coupled to the processing element, for adjusting the at least one printing parameter of the printing apparatus according to the modified barcode profile;

wherein the reference barcode profile is derived from scanning the barcode with a point light source.

9. The printing control apparatus of claim 8, wherein the barcode is generated by the printing apparatus.

10. The printing control apparatus of claim 8, wherein the reference barcode profile is a default luminance maximum value.

11. The printing control apparatus of claim 8, wherein the processing element further calculates an initial threshold according to the barcode profile, a maximum reference luminance value of the reference barcode profile and a maximum luminance value of the barcode profile, and derives the threshold according to the initial threshold and a ratio of the maximum reference luminance value to the maximum luminance value.

12. The printing control apparatus of claim 8, wherein the processing element calculates a maximum reference luminance value of the reference barcode profile and a maximum luminance value of the barcode profile, and derives a first modified barcode profile according to the barcode profile and a ratio of the maximum reference luminance value to the maximum luminance value.

13. The printing control apparatus of claim 12, wherein the processing element determines an adjustment range according to the first modified barcode profile, the grading information and the threshold, and derives the modified barcode profile according to the first modified barcode profile, the grading information and the adjustment range.

14. The printing control apparatus of claim 8, wherein the grading information comprises at least one of the symbol contrast, the decodability and the bar width growth.

* * * * *